United States Patent [19]
Yamazaki

[11] Patent Number: 5,820,650
[45] Date of Patent: Oct. 13, 1998

[54] OPTICAL PROCESSING APPARATUS AND OPTICAL PROCESSING METHOD

[75] Inventor: Shunpei Yamazaki, Tokyo, Japan

[73] Assignee: Semiconductor Energy Laboratory Co., Ltd., Kanagawa-ken, Japan

[21] Appl. No.: 702,836

[22] Filed: Aug. 22, 1996

[30] Foreign Application Priority Data

Aug. 29, 1995 [JP] Japan .................................. 7-243762

[51] Int. Cl.[6] ................................................ C03B 23/035
[52] U.S. Cl. .................. 65/104; 65/110; 65/111; 65/117; 65/262; 65/285; 65/300; 117/43; 117/904
[58] Field of Search ............... 117/43, 904; 438/166; 148/DIG. 90; 65/29.18, 30.1, 32.3, 33.1, 33.2, 60.8, 110, 158, 111, 117, 204, 262, 267, 285, 300, 104, 106

[56] References Cited

U.S. PATENT DOCUMENTS

| | | | |
|---|---|---|---|
| 3,977,856 | 8/1976 | Rosen ............................ | 65/29.18 |
| 5,086,352 | 2/1992 | Yamagata et al. .................... | 359/350 |
| 5,120,394 | 6/1992 | Mukai ................................ | 156/610 |
| 5,302,230 | 4/1994 | Ino et al. ............................ | 156/603 |
| 5,328,549 | 7/1994 | Bozler et al. ....................... | 437/226 |
| 5,432,122 | 7/1995 | Chae ................................... | 437/101 |
| 5,454,347 | 10/1995 | Shibata et al. ..................... | 117/202 |
| 5,492,843 | 2/1996 | Adachi et al. ...................... | 437/21 |
| 5,561,081 | 10/1996 | Takenouchi et al. ............... | 437/174 |
| 5,591,668 | 1/1997 | Maegawa et al. .................. | 437/174 |

Primary Examiner—Stanley S. Silverman
Assistant Examiner—Sean Vincent
Attorney, Agent, or Firm—Fish & Richardson P.C.

[57] ABSTRACT

A glass substrate is positioned between a chamber with a reduced pressure and a chamber filled with a heated helium, and the glass substrate is forcibly bent by the pressure difference and the heated helium gas into a uniform shape. The irradiation of laser light is carried out in this state to compensate the difference of annealing effects due to fine difference of deformation of the respective glass substrates.

20 Claims, 2 Drawing Sheets

OPTICAL PROCESSING APPARATUS AND OPTICAL PROCESSING METHOD

BACKGROUND OF THE INVENTION

1. Field of the Invention

The present invention relates to an apparatus and a method for irradiating an object to be irradiated formed on a substrate with laser light or intense light.

2. Description of the Related Art

There are known techniques in which fine working, various kinds of annealing and the like are carried out by using laser light. As a concrete example of such techniques, there is a technique in which an amorphous silicon film formed on a glass substrate is irradiated with laser light to be transformed into a crystalline silicon film. Also known is a technique in which irradiation of laser light is carried out, using a silicon film (amorphous silicon film or crystalline silicon film) formed on a glass substrate, to activate source and drain regions when fabricating a thin film transistor.

In the former technique, an amorphous silicon film is first formed on a glass substrate by a plasma CVD method or the like, and then irradiated with laser light so as to be transformed into a crystalline silicon film.

In general, when irradiation of laser light is carried out, a beam shape of the laser light is transformed into a desired shape by an optical system. At this time, the range in a depth direction within which the laser light focuses (this length of the range will be defined as depth of focus) is about several tens $\mu$m to 100 $\mu$m. Of course, this depth of focus changes depending upon the configuration of an optical system, a beam shape, and further its sectional area. Especially, when the beam shape is enlarged by the optical system to carry out the irradiation to a large area, the depth of focus becomes short. Thus, when the area to be irradiated increases, the focus positioning becomes difficult.

At present, when a planar surface such as an amorphous silicon film is irradiated with laser light, it is necessary to limit the roughness of the surface of the amorphous silicon film to a size not larger than about 100 $\mu$m, preferably to a size much smaller than 100 $\mu$m. That is, if the roughness is not limited within a predetermined range, the surface to be irradiated becomes out of focus of a laser beam, so that a desired annealing effect can not be obtained. Further, the annealing effect becomes uneven in accordance with the roughness. This results in forming a crystalline silicon film having uneven crystallinity.

In order to solve the problem, it is effective to use a substrate with a superior smoothness. However, in general, an inexpensive glass substrate is used for a liquid crystal electro-optical device. This substrate has poor smoothness. In order to improve this smoothness, a method of polishing the surface of the substrate into a smooth one is known. However, since the cheap glass substrate as mentioned above has an originally poor uniformity in constituent materials, fine roughness is still produced by heating at the irradiation of laser light. Further, a polishing step for obtaining a required smoothness causes an increase in production cost, so that it is not preferable as a production technique.

There are also a known techniques in which various kinds of annealing are conducted by irradiation of light such as ultraviolet rays or infrared rays instead of the laser light. However, the above problem still occurs in this case. Nevertheless, if the depth of focus is much larger than the deformation of a substrate, the above problem is not observed, especially.

SUMMARY OF THE INVENTION

It is therefore an object of the present invention to provide a technique for making the effect of laser light or intense light constant by eliminating the effect of the fine roughness of a substrate.

The present invention described in the specification is characterized in that a glass substrate is forcibly deformed (transformed) to form a uniform shape at the irradiation of laser light or intense light. The irradiation of the laser light or intense light is carried out in accordance with the deformed (transformed) shape, so that a constant effect can always be obtained over the entire surface of the glass substrate.

In the present invention, as examples of the object to be irradiated with the laser light or intense light are an amorphous silicon film, a crystalline silicon film, and a device under fabrication (for example, thin film transistor or thin film diode).

The present invention is especially useful when a cheap glass substrate is employed as a substrate. Further, the present invention is useful as the area of the substrate increases. Further, it is effective as the depth of focus of the irradiating laser light or intense light is short.

According to one aspect of the present invention, an apparatus for irradiation of laser light or intense light is characterized by comprising means for deforming (transforming) a glass substrate by using a pressure difference of a gas, and means for irradiating the deformed (transformed) glass substrate with the laser light.

The apparatus having the above structure is shown in FIG. 1. FIGS. 1(A) and 1(B) are sectional views showing the apparatus viewed from different directions by 90 degrees. In the structure shown in FIG. 1, a laser light source 114 irradiates a laser light onto glass substrate 103 forcibly deformed (transformed) by heated helium gas. In this case, since the glass substrate can be deformed (transformed) into a desired shape, it is possible to eliminate the effect of shape which differs in every glass substrates.

According to another aspect of the present invention, an apparatus for irradiation of laser light or intense light is characterized by comprising means for forcibly deforming (transforming) a glass substrate by using a pressure difference of gases, and means for scanning and irradiating the laser light or intense light onto deformed (transformed) glass substrate while changing the focus distance of the light.

The concrete example of the above structure is shown in FIG. 1. In the structure shown in FIG. 1, a glass substrate 103 is heated by a helium gas heated by a heater 110, and is deformed (transformed) into a desired shape. When the irradiation of laser light is carried out, a casing body 101 constituting the apparatus is moved along a guide rail 113. At the same time, the casing body 101 is finely moved up and down by a lifting device 111. According to this, the scanning and irradiation of laser light 106 are carried out. Further, in scanning and irradiating the laser light, the surface to be irradiated is always within the depth of focus of the laser light 106.

In the present invention, it is preferable to use a helium as a gas for applying a pressure to the glass substrate 103 and heating the substrate. This is because the thermal conductivity of the helium is so large as 1510 $Wm^{-1}K^{-1}$ at 300 K. As a gas having the thermal conductivity of not less than 1000 $Wm^{-1}K^{-1}$, other than the helium, $D_2$ (1406 $Wm^{-1}K^{-1}$ at 300 K), $H_2$ (1815 $Wm^{-1}K^{-1}$ at 300 K), and the like may be used. However, in view of safety, it is preferable to use the helium.

Also, in the present invention, it is effective to set the distribution of the depth of focus along the shape of the glass substrate forcibly deformed (transformed). For example, when the laser light is made into a linear laser beam, and the irradiation of the laser light is carried out while scanning the substrate in a direction orthogonal to the longitudinal direction of the laser beam, the distribution of the depth of focus in the longitudinal direction of the laser beam is set along the curved shape of the glass substrate having the surface to be irradiated. Then, the uniformity of the annealing effect in the longitudinal direction of the laser light can be improved.

According to still another aspect of the present invention, in the state where a glass substrate is forcibly deformed (transformed) into a desired shape by using the pressure of a heated gas, a semiconductor film formed on the glass substrate is irradiated with laser light or intense light.

In the case where the laser irradiation is carried out by using an apparatus shown in FIG. 1, the pressure in a chamber 107 is made lower than that in a chamber 108, and a helium gas heated by a heater 110 is circulated through the chamber 108. With this structure, a glass substrate 103 is deformed (transformed) into a convex state by the pressure from the chamber 108 and the heat from the heated helium gas.

The deformation (transformation) of the glass substrate can be made uniform almost irrespective of the roughness of the glass substrate. Accordingly, when the laser beam is adjusted to have a predetermined depth of focus, the casing body is moved while moving up and down in accordance with the shape of the glass substrate, and the irradiation of the laser light is carried out during the movement, the scanning and irradiation of the laser light can be carried out while the surface to be irradiated exists within the depth of focus. That is, annealing by the irradiation of laser light can be carried out with high uniformity.

According to the method of the present invention, the glass substrate having the surface to be irradiated is forcibly deformed (transformed) into a desired shape, and the depth of focus of the laser light and the scanning method at the irradiation are set to fit the desired shape, thereby enabling the surface to be irradiated to always exists in the depth of focus. Thus, annealing with high uniformity is realized.

DETAILED DESCRIPTION OF THE INVENTION

Figure 1A:
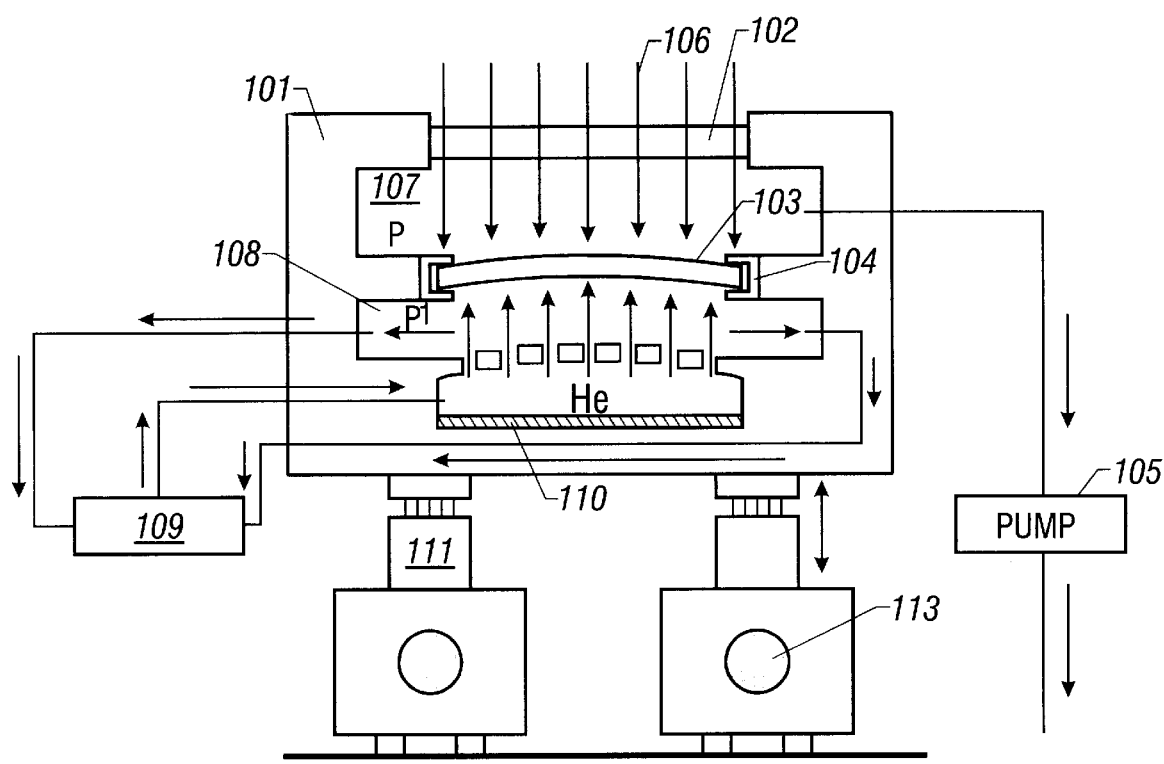
FIG. 1(A) is a view showing an apparatus for carrying out irradiation of laser light according to the present invention.
Figure 1B:
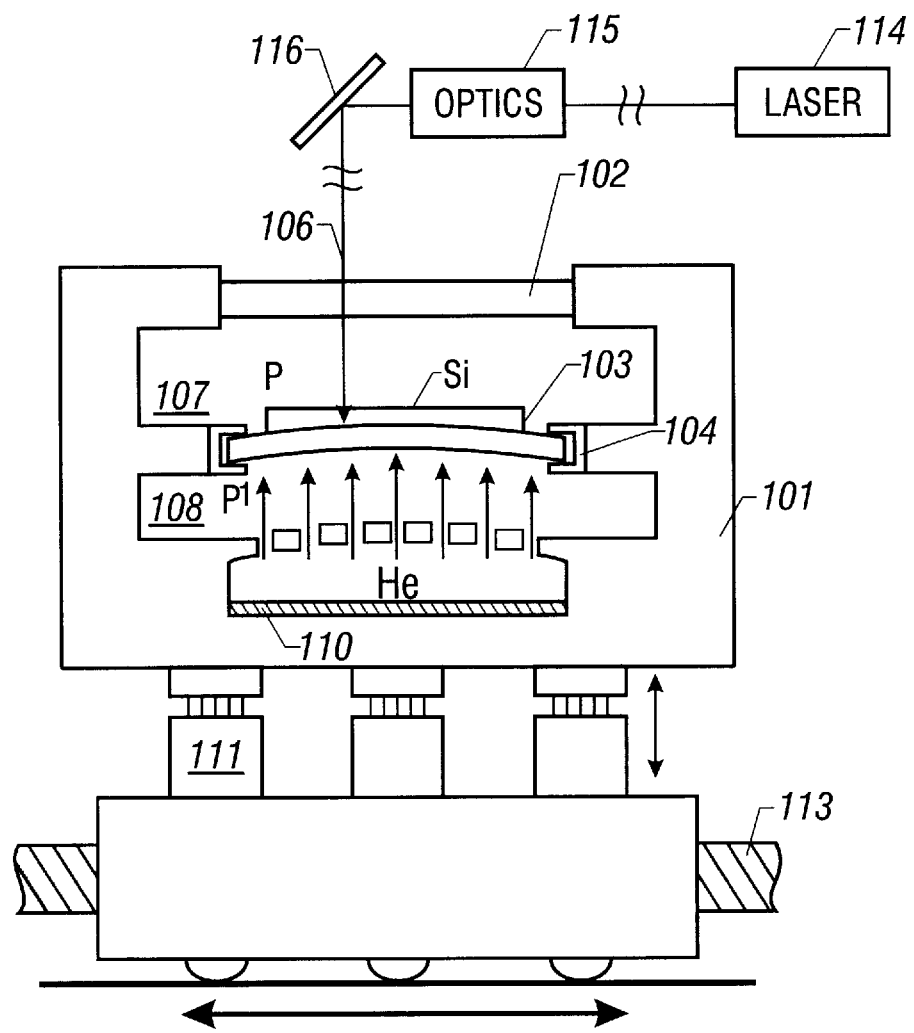
FIG. 1(B) is a view showing the apparatus of FIG. 1(A) viewed from a different direction by 90 degrees.

FIGS. 1(A) and 1(B) show an apparatus for irradiation of laser light employed in an embodiment of the present invention. The apparatus shown in FIGS. 1(A) and 1(B) is an apparatus for annealing a silicon film or a semiconductor device under fabricating a glass substrate. FIGS. 1(A) and 1(B) respectively show the apparatus viewed from different directions by 90 degrees.

The apparatus for irradiation of laser light shown in FIG. 1 has a structure in which a glass substrate 103 is fixed to a casing body 101 by a frame 104, and the casing body 101 is moved along a guide rail 113 while moving up and down by a lifting device 111 during the irradiation of linear laser light 106. Glass substrate 103 is covered with semiconductor material 200.

The inside of the casing body is divided into two chambers 107 and 108. The chamber 107 has airtightness, and is equipped with an exhaust pump 105 to make a reduced pressure state. The chamber 108 has a structure by which a helium gas is circulated through the chamber by a pump 109. The helium gas circulating through the chamber 108 is heated by a heater 110. The glass substrate is heated by the heated helium gas.

Here, the pressure in the chamber 107 is reduced, while the pressure in the chamber 108 is not increased or decreased. Basically, it is sufficient if the chamber 107 can be made into a reduced pressure state relative to the chamber 108. It should be noted that the airtightness of the chamber 107 is made to the extent that the pressure difference with respect to the chamber 108 is about a half atmosphere, preferably about 9/10 atmosphere.

Laser light from a light source (oscillator) 114 such as an excimer laser (for example, KrF excimer laser is used) is shaped into a longitudinal (linear) beam by an optical system 115. The laser beam is further reflected by a mirror 116 and irradiated on the glass substrate through a window 102 made of quartz.

The shape of the linear laser beam is, for example, such that a width is 1 cm and a length is 30 cm. Such shaping is carried out so that the irradiation of laser light can be carried out for the entire of the substrate by scanning in one direction. If such an irradiation method is adopted, the irradiation method of the laser light is simplified and high productivity can be obtained.

In order to use the apparatus shown in FIG. 1, the chambers 107 and 108 are first made into a predetermined pressure difference state, and in the state where the glass substrate is heated by the helium gas heated by the heater 110, the degree of deformation (transformation) of the glass substrate is measured.

The heating by the helium gas forcibly deforms the glass substrate. As a result, the glass substrate having the roughness of about several hundred μm is deformed (transformed) into a uniform shape. As a result of this deformation (transformation), the roughness of the surface of the glass substrate is rectified.

As conditions under which this glass substrate is forcibly deformed (transformed), for example, the chamber 107 is made into a reduced pressure state of 0.5 atmosphere, and the chamber 108 is not subjected to pressure control but placed in the state where helium is circulated. The heating to the helium is adjusted so that the glass substrate is heated up to 500° C. The glass substrate is heated up to a temperature not lower than 450° C. and not higher than a strain point of the glass substrate.

It should be noted that it is no problem even if the gas is flown into the chamber 107 from the chamber 108. That is, if a predetermined pressure difference can be maintained, the complete airtightness is not required to be maintained.

It is necessary to examine the degree of the deformation (transformation) of the glass substrate for several samples in advance. Based on the measured values, the distribution of the depth of focus of the laser light is adjusted. That is, in accordance with the shape of the glass substrate deformed (transformed) into a convex shape by the heating, the distribution of the depth of focus in the longitudinal direction of the linear laser beam is adjusted. This adjustment is carried out by adjusting the optical system 115.

Since the adjustment of the depth of focus in the scanning direction of the laser light can not be carried out by only the adjustment of the optical system, the correction in this direction is carried out by the lifting device 111. That is, the movement of the casing body 101 for scanning the laser light is carried out while the casing body 101 is slightly moved up and down by the lifting apparatus 111.

As shown in FIG. 1(B), the irradiation of laser light is carried out while the casing body 101 is moved along the guide rail 113. At this time, the casing body 101 is moved up and down by the lifting device 111, so that the focus of the laser light 106 is changed along with the deformation of the substrate 103. Thus, the surface to be irradiated always exists in the range of the depth of focus.

As described above, when the annealing by the laser light irradiation is carried out by using the apparatus shown in FIG. 1, even if the respective glass substrates have finely different deformation or roughness, uniform annealing effects can be obtained.

Even if the respective glass substrates include different deformation or roughness, the substrate is forcibly deformed (transformed), the depth of focus of the laser light is adjusted in accordance with the deformed (transformed) state, and the laser irradiation is carried out while changing the focus position in accordance with the deformation (transformation), then it is possible to make the entire surface of the surface to be irradiated exist in the depth of focus during the irradiation of laser light while scanning. Thus, it is possible to obtain uniform effects by the laser light irradiation.

What is claimed is:

1. An optical processing method comprising the steps of:
   forcibly transforming a glass substrate of an original shape into a different shape by using a pressure of a heated gas; and
   irradiating a semiconductor film formed on said glass substrate with intense light while said glass substrate is being forcibly transformed into said different shape.

2. The method of claim 1 wherein the intense light is shaped into a linear beam shape, and scanning and irradiation of the intense light is carried out along the different shape of said forcibly transformed glass substrate.

3. The method of claim 1 wherein the intense light is shaped into a linear beam shape, and distribution of depth of focus of the beam in a direction along the linear beam is set along the shape of said forcibly transformed glass substrate.

4. The method of claim 1 wherein said intense light is irradiated to an amorphous silicon film provided on said glass substrate, or a crystalline silicon film provided on said glass substrate.

5. The method of claim 1 wherein said intense light is irradiated to a semiconductor film provided on said glass substrate.

6. The method of claim 1 wherein a surface to focus said intense light on is provided within a depth of focus of said laser light or intense light throughout entirety of said glass substrate.

7. An optical processing apparatus for irradiation of intense light comprising:
   a casing body;
   a frame in said casing body having a substrate support adapted to hold a glass substrate;
   a first chamber provided in said casing body and in contact with an upper surface of said substrate;
   a second chamber provided in said casing body and in contact with a lower surface of said substrate;
   means for forming a pressure difference between said first chamber and said second chamber, said pressure difference being of a type and magnitude which when applied to the glass substrate changes a physical shape thereof to form a changed shape glass substrate; and
   means for irradiating said changed shape substrate with intense light simultaneously with the pressure difference which forms the changed shape substrate.

8. The apparatus of claim 7 wherein said means for forming further comprises means for supplying heated helium, and said glass substrate is also heated by the helium.

9. The apparatus of claim 7 wherein the intense light includes a linear beam, and distribution of depth of focus of the beam in a longitudinal direction of the linear beam is set in accordance with a shape of said transformed glass substrate.

10. The apparatus of claim 7 wherein said intense light is irradiated to an amorphous silicon film provided on said glass substrate, or a crystalline silicon film provided on said glass substrate.

11. The apparatus of claim 7 wherein said intense light is irradiated to a semiconductor film provided on said glass substrate.

12. The apparatus of claim 7 wherein a surface to focus said intense light on is provided within depth of focus of said laser light or intense light throughout entirety of said glass substrate.

13. The apparatus of claim 7 wherein said means for forming comprises means for supplying heated $D_2$ or $H_2$ gas to one side of said substrate, and wherein said glass substrate is also heated by the $D_2$ or $H_2$.

14. An optical processing apparatus for irradiation of intense light comprising:
   a casing body;
   means for supporting a substrate in said casing body;
   a first chamber provided in said casing body and in contact with an upper surface of the substrate;
   a second chamber provided in said casing body and in contact with a lower surface of the substrate;
   means for forming a pressure difference between said first chamber and said second chamber of a type and magnitude which when applied to the substrate, chances a physical shape thereof to form a changed shape substrate; and
   means for scanning and irradiating intense light onto said substrate simultaneously with the changing of the physical shape by said forming means while changing the focus distance of the light.

15. The apparatus of claim 14 wherein said pressure difference forming means comprises means for supplying heated helium, wherein said substrate is also heated by the helium.

16. The apparatus of claim 14 wherein the intense light includes a linear beam, and distribution of depth of focus of the beam in a longitudinal direction of the linear beam is set in accordance with a shape of said forcibly transformed glass substrate.

17. The apparatus of claim 14 wherein said intense light is irradiated to an amorphous silicon film provided on said glass substrate, or a crystalline silicon film provided on said glass substrate.

18. The apparatus of claim 14 wherein said intense light is irradiated to a semiconductor film provided on said glass substrate.

19. The apparatus of claim 14 wherein a surface to focus said intense light on is provided within depth of focus of said laser light or intense light throughout entirety of said glass substrate.

20. The apparatus of claim 14 wherein said pressure difference forming means comprises means for supplying heated $D_2$ or $H_2$ gas and said substrate is heated by the $D_2$ or $H_2$.

* * * * *